United States Patent [19]

McLoughlin et al.

[11] E Re. 29,839

[45] Reissued Nov. 21, 1978

[54] OPTICAL INSPECTION APPARATUS

[75] Inventors: Robert W. McLoughlin, Belfast; Colin P. Nuttall, Bangor, both of Northern Ireland

[73] Assignee: Gallaher Ltd., Belfast, Northern Ireland

[21] Appl. No.: 874,520

[22] Filed: Feb. 2, 1978

Related U.S. Patent Documents

Reissue of:

[64] Patent No.: 3,854,587
Issued: Dec. 17, 1974
Appl. No.: 371,685
Filed: Jun. 20, 1973

[30] Foreign Application Priority Data

Jun. 29, 1972 [GB] United Kingdom ..... 30557/72

[51] Int. Cl.[2] ..... B07C 5/342

[52] U.S. Cl. ..... 209/536; 209/564; 209/587

[58] Field of Search ..... 209/72, 111.6, 111.7; 250/562, 578, 227, 237, 223 R; 356/200, 237

[56] References Cited

U.S. PATENT DOCUMENTS

| | | | |
|---|---|---|---|
| 2,896,636 | 7/1959 | Powell et al. | 250/223 X |
| 3,334,240 | 8/1967 | Black | 250/223 R |
| 3,626,196 | 12/1971 | Arnaudin | 250/227 |

*Primary Examiner*—Allen N. Knowles
*Attorney, Agent, or Firm*—Andrus, Sceales, Starke & Sawall

[57] ABSTRACT

The invention is concerned with an optical inspection apparatus for monitoring a continuously moving rod, such as a tobacco rod. The apparatus comprises a circular head through which the rod passes, a first set of fibre optic conductors the ends of which terminate at an inner peripheral surface of the head and which transmits light from a source to the head to illuminate the rod passing through the head, and a second set of fibre optic conductors the ends of which also terminate at an inner surface of the head to pick up light reflected from the rod passing through the head and transmit that light to a photosensitive element. The second set of conductors are divided into angularly spaced groups around the head and adjacent groups lead to separate photosensitive elements. Preferably the light picked up by diametrically opposite pairs of groups are combined.

11 Claims, 6 Drawing Figures

OPTICAL INSPECTION APPARATUS

Matter enclosed in heavy brackets [ ] appears in the original patent but forms no part of this reissue specification; matter printed in italics indicates the additions made by reissue.

The invention is concerned with optical inspection apparatus for monitoring a continuously moving rod, for example a cigarette rod, and for sensing critical variations in the reflective properties of the rod surface for example of a flaw in, or printing on, the surface. In a cigarette rod such a flaw may be produced by an imperfect lap seal of the wrapper or a tear in the paper produced by a particularly hard piece of tobacco stem.

Conventionally, cigarette inspection apparatus involves means for measuring the pressure drop caused by leaks in the surface of the cigarette assembly when air suction or pressure is applied. Methods have also been proposed for inspection by illuminating the rod and detecting the reflected light on a number of photoelectric cells. However, none of these are entirely satisfactory for high speed production.

In accordance with the present invention, an optical inspection device for monitoring a continuously moving rod comprises a circular head through which the rod passes, a first set of fibre optic conductors the ends of which terminate at an inner peripheral surface of the head and which transmit light from a source to the head to illuminate the rod passing through the head, and a second set of fibre optic conductors the ends of which also terminate at an inner peripheral surface of the head to pick up light reflected from the rod passing through the head and transmit that light to a photosensitive element, characterised in that the second set of conductors are divided into angularly spaced groups around the head and adjacent groups lead to separate photosensitive elements, *the outputs of which are fed into separate channels connected to comparator means which produces a fault signal responsive to the outputs of the photosensitive elements.*

With clean undamaged rod passing through the circular head the light reflected from the rod surface onto the second set of conductors is reasonably constant. When a fault passes under one of the second set of conductors, the light reflected is momentarily decreased or increased. The light level is preferably converted into an electrical signal level by an appropriate photoelectric element such as a phototransistor or photodiode forming the photosensitive element, at the receiving end of the appropriate guide of the second set. The signal level is compared with a datum level in a comparator circuit and if the signal level differs from the datum level by more than a predetermined amount, a fault signal may be produced. By means of an appropriate logic circuitry, the fault signal may be stored and subsequently be used for operating a rejection mechanism when the part of the rod at which the fault has been sensed reaches a rejection point.

The inspection apparatus may be used with any form of rod, for example drawn steel rod or plastic rod, but we are particularly interested in its application in the tobacco field, for monitoring a cigarette rod or filter rod, consisting of natural, reconstituted, or synthetic tobacco rag or a filter material respectively in a tubular paper wrapper.

The use of fibre optic conductors enables the light to be transmitted to and from the inner periphery of the head which may be very closely spaced from the surface of the rod. As a result the apparatus is extremely sensitive. We find that the sensitivity is maximised if the ends of the first set of fibre optic conductors terminate in a first annular array at the inner peripheral surface of the head, and the ends of the second set of fibre optic conductors terminate in a second annular array which is axially displaced from the first array at the inner peripheral surface of the head.

The spacing between the rod surface and the inner periphery of the head is not critical and a simple head may be used with a rod within a range of diameters. The division of the second set of conductors into angularly spaced groups ensures that only a proportion of the area of rod surface is viewed by any one photosensitive element. This effectively reduces the noise signal resulting for example from paper water marks and minor surface variations, received by that element without reducing the ability to recognise the signal generated by a genuine fault, and hence improves the resulting signal/noise ratio.

With a fast moving rod, there is inevitably some lateral deviation in the rod and in extreme cases this could produce a false signal. To overcome this, the second set of conductors are divided into at least four, and preferably more, angularly spaced groups and the light picked up and transmitted away from the head by diametrically opposed pairs of the groups are combined either before co-operating with a common photosensitive element, or by summation of the outputs of the corresponding photosensitive elements. Providing that the average distance between the rod surface and the inner periphery of the head is such that one is working on the negative slope portion of the y-guide characteristic, that is to say the reflected light received varies inversely as the distance between the rod surface and the inner periphery of the head, the sum of the light received by the diametrically opposed groups of conductors will then remain approximately constant irrespective of lateral movement of the rod relatively to the head.

A.C. coupling may be used as well in order to avoid any effects due to long term changes in the optical system, for example due to dirt or breakage of fibres, or in the photosensitive element, for example due to temperature.

The use of the negative slope portion of the characteristic with diametrically opposed pairs and A.C. coupling also allows a considerable range of nominal rod diameters to be inspected without changing the size of the circular head. Alternatively, the top of the hump of the characteristic may be used with or without A.C. coupling and with or without diametrically opposed pairs although generally only over a narrower range of rod diameters.

The optical inspection apparatus may be arranged to be fitted to a continuous rod cigarette making machine and to be used in series with a different rod monitoring apparatus, such as a nucleonic control and density monitoring apparatus, which is also arranged to provide a signal for operating a rejection mechanism for an unacceptable rod portion corresponding to a cigarette length. Since the monitoring of a particular rod portion by the optical inspection apparatus, and the monitoring of the same portion of the rod by the other monitoring apparatus will occur at different times, and the two apparatus may be spaced by other than an integral number of cigarette lengths, difficulties can arise in synchronizing a potential fault signal from each apparatus in a rejection control circuit so that an unacceptable rod portion can be rejected at a common rejection point by a fault signal from either apparatus.

For this purpose a fault signal store of the optical inspection apparatus preferably comprises a first bistable circuit arranged to be triggered by and to hold any fault signal from the comparator circuit upon the sensing of a fault in a portion of the rod, a second bistable circuit which is set by any fault signal held by the first bistable circuit and is triggered to receive and hold the fault signal by a first clock pulse corresponding to completion of passage of that rod portion through the optical inspection apparatus, the first clock pulse then resetting the first bistable circuit, and a third bistable circuit which is set by any fault signal held by the second bistable circuit and is triggered to receive and hold the fault signal by a second clock pulse corresponding to the leading end of that rod portion beginning its passage through the other monitoring apparatus, the second clock pulse then resetting the second bistable circuit whereby the fault signal is available at the output of the third bistable circuit for use in synchronism with a fault signal from the other monitoring apparatus for operating a rejection mechanism for that rod portion.

One example of an optical inspection apparatus constructed in accordance with the present invention and its use on a continuous cigarette rod making machine is illustrated in the accompanying drawings, in which.

Figure 1:
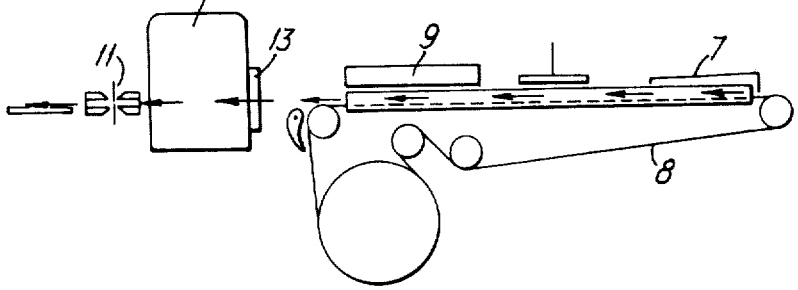
FIG. 1 is a diagrammatic side elevation of the machine.

As shown in FIG.1 the continuous cigarette rod making machine is conventional in having a garniture 7, through which a garniture tape 8 carries and folds the cigarette paper around the tobacco, the resulting tobacco rod passing beneath a heater 9, through a nucleonic weight control and density monitoring apparatus 10, to a cut off knife 11 which cuts the continuous rod into discrete cigarette lengths. Portions of the rod, corresponding to discrete cigarette lengths, sensed by the nucleonic apparatus 10 as being faulty are rejected and are deflected by a jet of air which is directed at the faulty cigarette immediately after it has been cut from the rod. The apparatus 10 has a memory store which ensures that the deflecting puff of air is provided only when the faulty cigarette has been cut off by the knife 11.

The optical inspection apparatus according to the invention is shown in FIG. 1 at 13 fixed to and immediately upstream of the nucleonic apparatus 10. Any fault in a rod portion as sensed by the apparatus 13 causes a fault signal to be fed into the memory store of the nucleonic apparatus 10 so that again the faulty cigarette is deflected after cutting by the knife 11, the necessary synchronisation being provided by the circuit of FIG. 3 to be later described.

Figure 2:
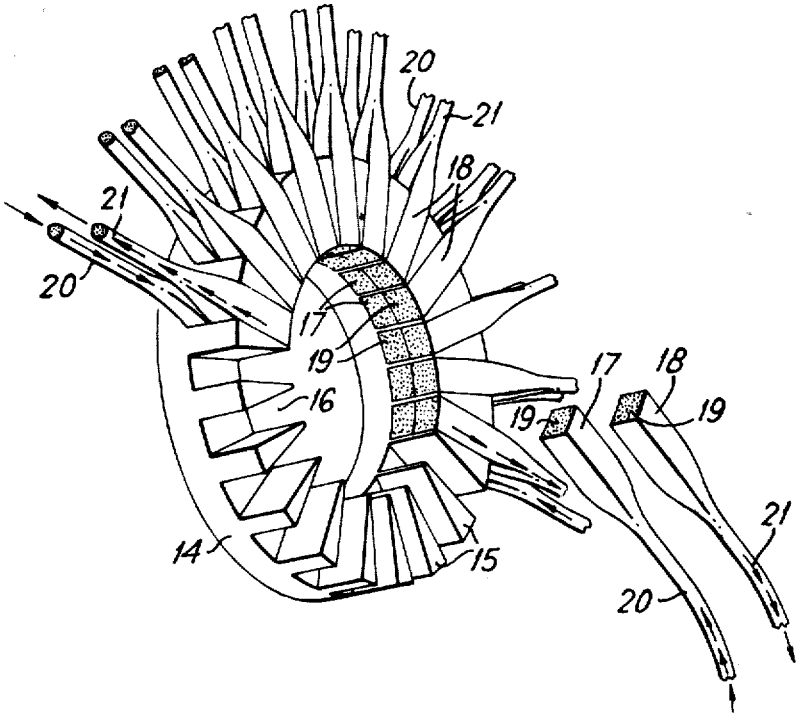
FIG. 2 is a perspective exploded view of the circular head of the optical inspection apparatus.

Physically the optical inspection apparatus 13 has a circular head which is shown in FIG. 2. The head has a support 14 in the form of an annular brass block formed on one face with 20 wedge-shaped radially extending webs 15. Nesting in each slot 16 between adjacent pairs of webs 15 are two layers of blocks 17 and 18 respectively in which are embedded the ends 19 of fibre optic conductor groups forming light guides 20 and 21 respectively. The ends 19 are spread into a rectangular section and are potted in epoxy resin. The extreme tips of the ends 19 and the end faces of the blocks 17 and 18 are flush with the inner peripheral surface of the block 14, the blocks 17 providing one annular array and the blocks 18 providing a second annular array which is axially spaced from the first array.

Figure 3:
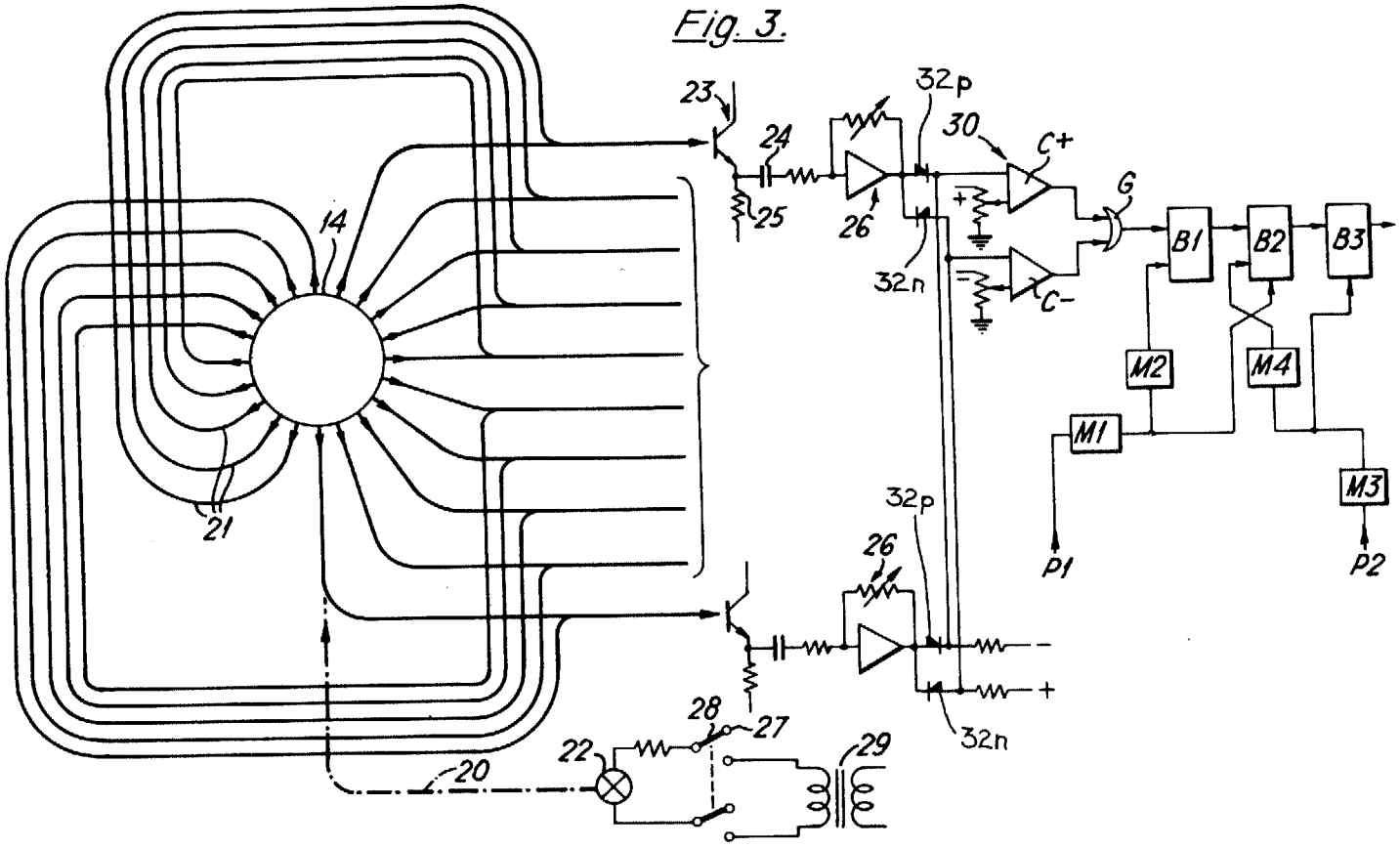
FIG. 3 is a circuit diagram of the optical inspection apparatus.

As suggested in FIG. 3, light is directed into the other ends of the light guides 20 from a lamp 22. The light is conducted along the guides 20 and is transmitted radially into the head from the first array onto the surface of a cigarette rod passing axially through the head. Light reflected from the surface of the rod is picked up by the ends of the guides 21 in the second annular array and transmitted away to a remote position.

As indicated in FIG. 3, each pair of guides 21 which lead from diametrically opposite positions in the head are united into a common fibre optic guide and the light transmitted along those guides is transmitted from the end of the combined guide onto a separate phototransistor 23 in which the light level is converted into an electrical signal level. The resulting electrical signal is transmitted through an A.C. coupling capacitor 24 to a separate amplifier 26 with preset gain adjustment. The amplifier input is the voltage developed across a load resistor 25 in the emitter circuit of the phototransistor 23. The A.C. coupling eliminates problems due to differences in standing current in the phototransistors or due to small drifts in output caused by lamp ageing, different grades of cigarette paper and any other sources of slow output change common to all outputs.

The lamp 22 is normally energised through a terminal 27 with 5 volts D.C. but for test purposes a double ganged switch 28 is changed over so that the lamp is energised from an A.C. source 29. This is necessary as otherwise no signal would be transmitted by the A.C. coupling capacitor 24 in the absence of fluctuation caused by a rod passing through the head 14.

Only two channels are illustrated in FIG. 3 but it will be apparent that there are ten channels in all each including a separate phototransistor 23 and amplifier 26. The outputs of all the amplifiers are however fed [into] *to* a common comparator circuit 30 *via positive diodes 32p and negative diodes 32n which permit only the largest positive and negative signals in the channels to be applied to the corresponding comparator C+ and C−.*

Figure 5:
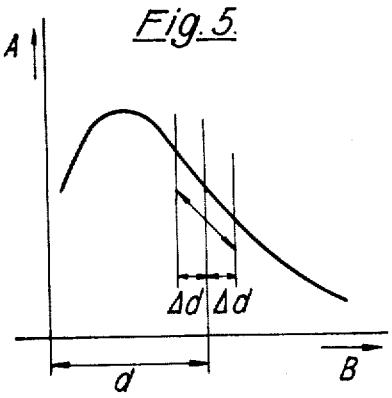
FIG. 5 is a y-guide characteristic related to the optical inspection apparatus; and, FIG. 6 is an axial cross-section through a rod passing through the circular head.
Figure 6:
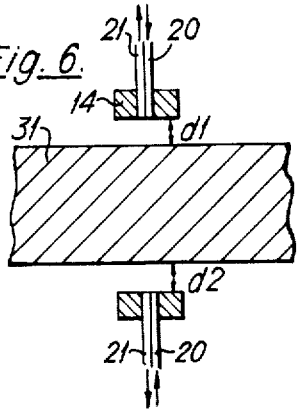

FIG. 5 illustrates the y-guide characteristic of the reflected light in the head picked up by the light guides 21. The axis A represents the reflected light picked up and the axis B represents the distance d of the rod surface from the inner peripheral surface of the circular head. The portions marked off on the graph represent variations Δd in this distance owing to lateral deviations in the rod relatively to the head. These values will be apparent from FIG. 6 which shows a cigarette rod 31 passing through the head 14. At one position a distance d1 is apparent and at the diametrically opposite position a distance d2. Provided that the distance d is in the substantially straight downward sloping portion of the graph in FIG. 5, the sum of the light picked up by the diametrically opposite guides 21 will be substantially constant irrespective of whether d1 and d2 are equal.

The electrical signal level produced by the phototransistor 23 will be positive or negative and substantially proportional to the difference between the light level picked up by the corresponding pair of guides 21 and a datum level. These positive or negative electrical signals will after amplification all be fed [into] *to* the comparator circuit 30, positive pulses *from the channel with the most positive signal level* passing into comparator C+ and negative pulses *from the channel with the most negative signal level* into comparator C−. If the signal level is in absolute terms (i.e. irrespective of polarity) greater than a preset allowable level, representing the allowable tolerance in the reflectivity of the rod, and hence a faulty rod portion, fixed amplitude positive going fault pulses are produced at the outputs of the comparators and are combined to produce fault pulses through a logical OR gate G.

The appearance of a fault signal at the gate G sets a first bistable flip-flop B1. The fault signal is transferred to a second bistable flip-flop B2 upon reception of the first subsequent clock pulse P1 through a monostable circuit M1, the clock pulse immediately resetting the first bistable B1 through a second monostable circuit M2. The fault signal is transmitted from the bistable B2 to a third bistable flip-flop B3 upon reception of the next succeeding clock pulse P2 through a third monostable circuit M3.

Immediately afterwards the clock pulse P2 resets the bistable B2 through a fourth monostable circuit M4.

Figure 4:
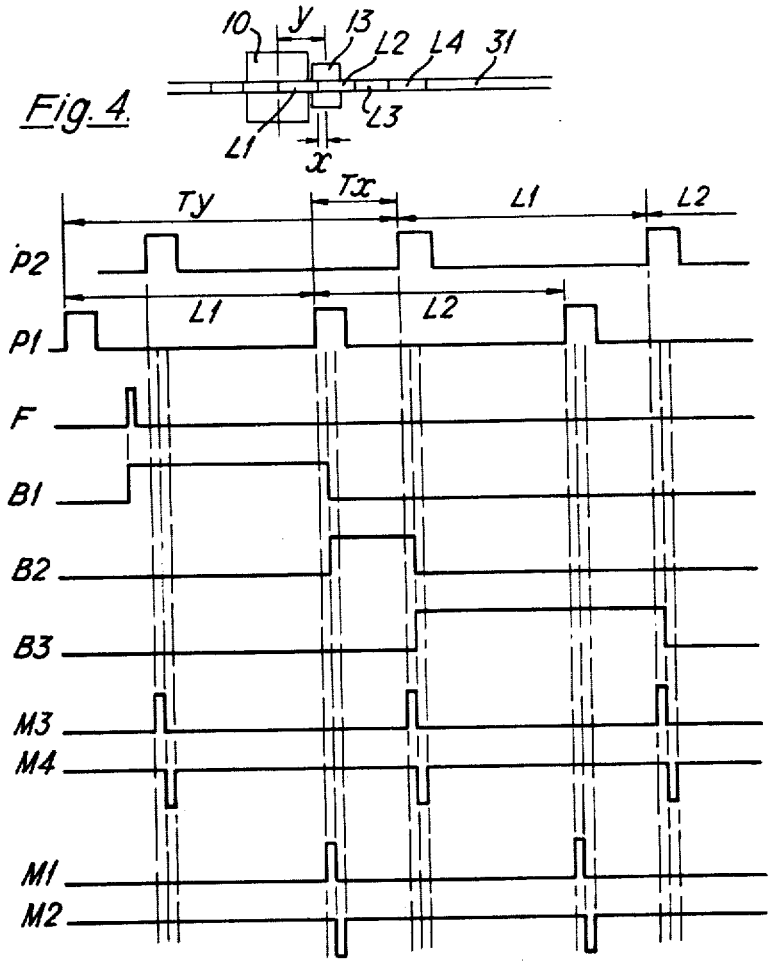
FIG. 4 is a diagram showing the operation of the FIG. 3 circuit.

The sequence of operation controlled by the clock pulses P1 and P2 will be apparent from FIG. 4. At the top of FIG. 4 there is indicated diagrammatically the cigarette rod 31 having consecutive rod portions corresponding to cigarettes L1, L2, L3 and L4 passing from right to left successively through the optical inspection apparatus 13 and the nucleonic apparatus 10. The lower part of FIG. 4 represents the various pulse trains to a common time scale.

The separation of the sensing points of the two monitoring apparatus 13 and 10 is indicated as y and the distance x is the distance by which y exceeds one cigarette length. Both the clock pulses P1 and P2 have a period equal to the time it takes for one cigarette length to pass a fixed point. The leading edge of each pulse P2 corresponds to the time that a cut point between adjacent rod portions of the continuous cigarette rod passes the sensing point of the nucleonic apparatus 10 and the leading edge of each pulse P1 is displaced from the corresponding pulse P2 by a time corresponding to the distance y.

FIG. 4 is prepared to represent a case in which a fault signal is produced in the length L1 of the rod by the optical inspection apparatus 13. Thus the fault pulse F is generated and immediately sets the bistable B1. At the next pulse P1 the fault is transmitted to the bistable B2 and at the next pulse P2 the fault signal is transmitted to the bistable B3. It will be seen that the triggering pulse produced by the monostable M3 corresponds with the clock pulse P2 and is immediately followed by the resetting pulse produced by the monostable M4. Similarly, the triggering pulse produced by the monostable M1 coincides with the clock pulse P1 and is immediately followed by the resetting pulse produced by the monostable M2.

The pulses produced by the monostable pulse generators M1, M2, M3 and M4 are very short, for example of the order of 1 microsecond compared with the time interval of a passage of 1 cigarette length which is typically 15 milliseconds or longer.

The effect of the logic circuitry is that the fault signal is delayed in the bistables B1 and B2 whilst the corresponding rod portion in which the fault has been sensed has just completed its passage through the nucleonic apparatus 10. The fault signal is then brought into synchronism with the potential fault signal produced by the nucleonic apparatus 10 so that both potential signals can be stored in a memory store of the apparatus 10 whilst the corresponding rod portion passes to and is cut by the knife 11 prior to deflection by the air jet.

We claim:

1. An optical inspection [appratus] *apparatus* for monitoring a continuously moving rod, said apparatus comprising a circular head through which said rod passes, a first set of fibre optic conductors the ends of which [terminated] *terminate* at an inner peripheral surface of said head and which transmits light from a source to said head to illuminate said rod passing therethrough, and a second set of fibre optic conductors the ends of which also terminate at said inner peripheral surface of said head to pick up light reflected from said rod passing through said head and transmit said reflected light to [a] photosensitive element[,] *means producing output signals responsive to said light,* said second set of conductors being divided into angularly spaced groups around said head and adjacent groups leading to separate photosensitive [elements] *element means, and comparator means coupled to said photosensitive element means for separately receiving the output signals of said photosensitive element means, for comparing the separate output signals of said photosensitive element means with a datum level and for providing a fault signal responsive to said comparison.*

2. Apparatus according to claim 1, wherein said ends of said first set of fibre optic conductors terminate in a first annular array at said inner perpheral surface of said head, and said ends of said second set of fibre optic conductors terminate in a second annular array which is axially displaced from said first array at said inner peripheral surface of said head.

3. Apparatus according to claim 1, wherein said second set of conductors are divided into at least four angularly spaced groups *to form at least two pairs of diametrically opposed groups* and said light picked up and transmitted away from said head by diametrically opposed [pairs of said] groups *of said pairs* are combined either before co-operating with a common photosensitive element of by summation of the outputs of two corresponding photosensitive elements, *said photosensitive element or elements forming said photosensitive element means.*

4. Apparatus according to claim 3, wherein said photosensitive [elements are] *element means includes* photoelectric elements from which are produced [first] *output* electrical signals each corresponding to the light received by one of said diametrically opposite [pair] *pairs* of groups of said second set of conductors, [there being a] *and wherein in said* comparator [circuit in which] *means* the level of said [first] *output* electrical signals is compared to [a] *said* datum level and a fault signal is produced if said [first] *output* electrical signals deviate from said datum level by more than a predetermined amount, *and wherein said apparatus further includes* means for storing said fault signal and means for subsequently providing said stored signal at an output for use in operating a rejection mechanism.

5. Apparatus according to claim 4, wherein said photoelectric elements are phototransistors or photodiodes.

6. Apparatus according to claim 4, wherein each photoelectric element is A.C. coupled to the input of an amplifier the output of which is connected to said comparator [circuit] *means.*

7. Apparatus according to claim 4, wherein all said photoelectric elements are connected to [a] common comparator [circuit] *circuitry of said comparator means.*

8. Apparatus according to claim 4, which is arranged to be fitted to a continuous rod cigarette making machine and to be used in series with a different rod monitoring apparatus that is also arranged to provide a signal for operating a rejection mechanism for an unacceptable cigarette, wherein said fault signal store of said optical inspection apparatus comprises a first bistable circuit arranged to be triggered by and to hold any fault signal from said comparator [circuit] *means* upon the sensing of a fault in a portion of said rod corresponding to a cigarette length, a second bistable circuit which is set by any faults signal held by said first bistable circuit and is triggered to receive and hold said fault signal by a first clock pulse corresponding to completion of passage of said portion through said optical inspection apparatus, said first clock pulse then resetting said first bistable circuit, and a third bistable circuit adapted to be set by any fault signal held by said second bistable circuit and to be triggered to receive and hold said fault signal by a second clock pulse corresponding to said leading edge of said rod portion beginning it's passage through said other [monitoroing] *monitoring* apparatus, said second clock pulse then resetting said second bistable circuit whereby said fault signal is available at the output of said third bistable circuit for use in synchronism with a fault signal from said other monitoring apparatus to operate a rejection mechanism for said cigarette produced by cutting off said rod portion.

*9. Apparatus according to claim 1 wherein said comparator means includes signal selection means interposed between said photosensitive element means and said comparator means for providing the largest magnitude output signal from said photosensitive element means for comparison with said datum level.*

*10. Apparatus according to claim 9 wherein said comparator means comprises common comparator circuitry for all of said photosensitive element means.*

*11. Apparatus according to claim 9 wherein said signal selection means comprises diode means.*

* * * * *